Dec. 21, 1965 W. E. STANDLEY ETAL 3,224,555
POWERED CONVEYOR MECHANISM FOR TURNING ARTICLES
Filed June 25, 1964
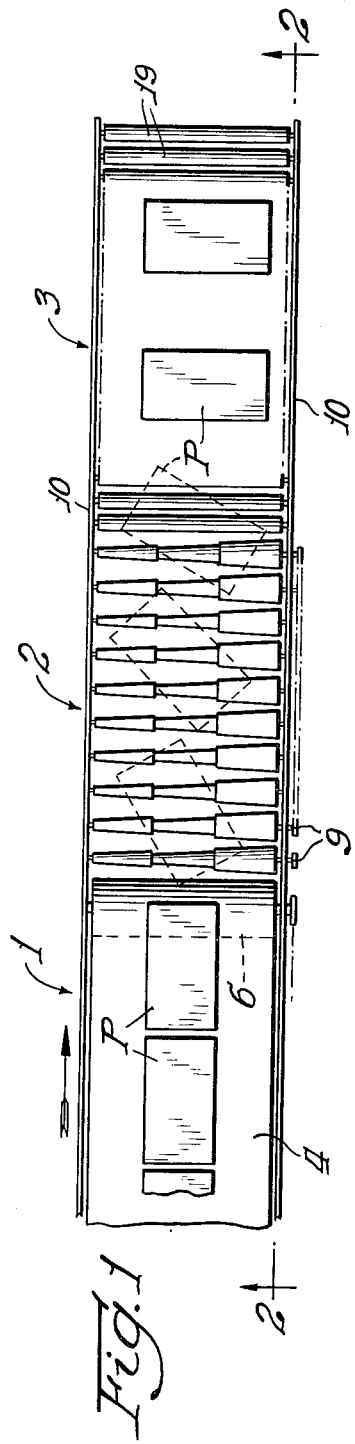
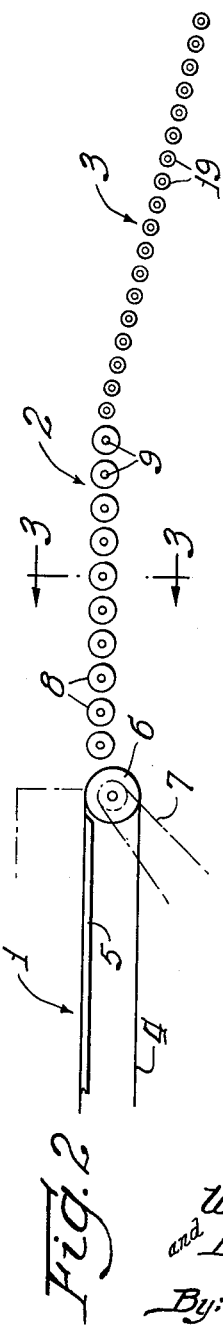
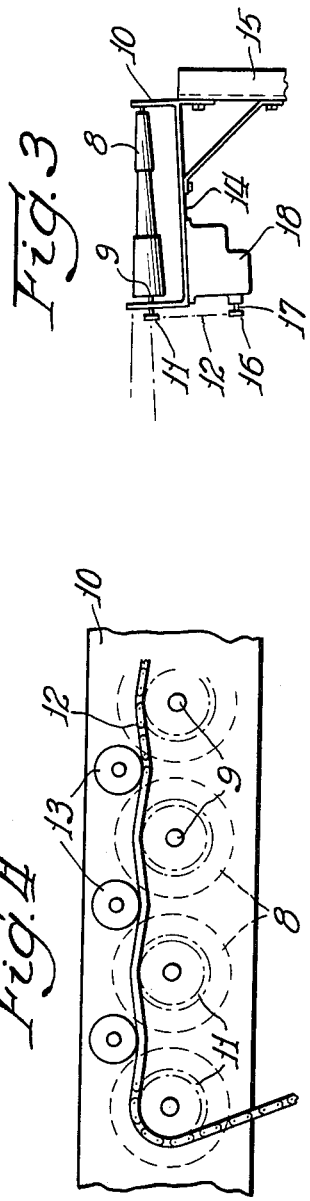
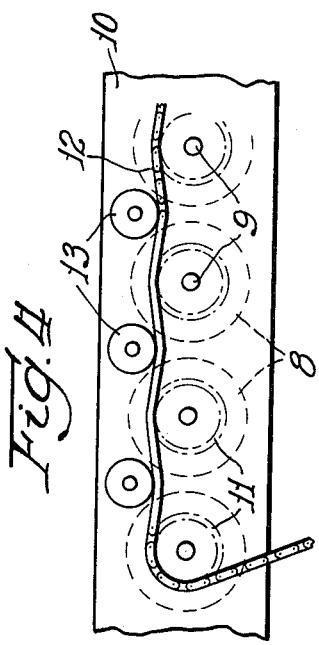
Inventors:
Wendell E. Standley
and Leonard C. Braun
By: E. A. Wagonseller
Atty.

United States Patent Office 3,224,555
Patented Dec. 21, 1965

3,224,555
POWERED CONVEYOR MECHANISM FOR TURNING ARTICLES
Wendell E. Standley, Lake Forest, and Leonard C. Braun, Elk Grove Village, Ill., assignors to Johns-Nigrelli-Johns, Inc., Skokie, Ill., a corporation of Illinois
Filed June 25, 1964, Ser. No. 377,885
1 Claim. (Cl. 198—33)

The present invention pertains to conveying means designed to turn packages and other articles as such articles are advanced.

An important object of the invention is to provide article turning means combined with a feeding and receiving conveyor, whereby articles delivered by the feeding conveyor may be effectively turned through angles of approximately 90 degrees and thus delivered onto the receiving conveyor.

Other objects and advantages of the present invention will become apparent as the description proceeds.

In the drawings—

FIGURE 1 is a somewhat schematic plan view of the turning mechanism arranged between two conveyors;

FIGURE 2 is a longitudinal section of the mechanism taken along line 2—2 of FIGURE 1;

FIGURE 3 is a transverse sectional view taken on line 3—3 of FIGURE 2; and

FIGURE 4 is a fragmentary side elevational view of the drive for the rollers on which the turning is effected.

The mechanism of the present invention is particularly useful in connection with handling packages of canned goods or beverages in situations where elongated rectangular packages are produced and delivered in a line in which such packages are disposed longitudinally and it is desired to turn such packages so that they will be arranged with their longitudinal axes disposed transversely of the line of travel.

As shown in the drawings, the packages P, P are advanced in abutted or closely spaced relation on a feeding conveyor 1 in the form of a traveling belt. The packages are delivered to the turning section, indicated as a whole at 2, where they are turned while advancing and then delivered to a receiving conveyor 3 which may lead to suitable loading mechanism where groups of packages may be loaded into shipping containers.

The belt 4 of the conveyor 1 is suitably supported on a plate or other supporting means 5 and passes around a roller 6 which is suitably actuated by a sprocket chain 7 driven by a motor, not shown.

The turning section 2 comprises a plurality of similar tapered rollers 8, 8 supported on parallel shafts 9, 9 journalled in side frame members 10, 10. As shown in FIGURE 4, at one end of each of the shafts 9 is fixed a sprocket which passes a sprocket chain 12. Idler sprockets 13, 13, supported on side frame member 10 bear upon the upper side of sprocket chain 12 and hold such chain securely against sprockets 11, 11. As shown in FIGURE 3, the shafts 9, 9 are disposed at an angle to the horizontal so that the upper, supporting surfaces of the tapered rollers are held in an approximately horizontal plane.

The side frame members 10, 10 are fixed on a lower transverse frame member 14 and these frame members are suitably supported on a base frame member 15. The sprocket chain 12 passes around a drive sprocket 16 mounted on the shaft 17 of a motor 18 secured on the transverse frame member 14.

The receiving conveyor 3 is illustrated as an inclined, gravity conveyor comprising a plurality of narrow rolls 19, 19 on which the articles will be discharged after leaving the turning section.

In the use of the mechanism, elongated rectangular packages or similar articles are advanced on conveyor 1, either abutted or closely spaced, and with the longitudinal axes of the packages aligned with the direction of travel. As soon as an advancing package starts to move on the turning section it will begin to turn in a direction to the left of its movement, as viewed in FIGURE 1. This is for the reason that the right hand side of the package will be traveling on the sections of the tapered rolls of larger diameter than the left hand side, and such larger diameter sections will have a higher linear speed than the smaller sections.

The drive means for the tapered rolls is preferably designed to rotate the rolls so that the linear speed of the articles traveling on the larger sections of the rolls is somewhat in excess of the linear speed of the belt 4 of feeding conveyor 1. By this arrangement the articles delivered onto the turning section will be advanced bodily at a rate greater than their advancement on conveyor 1, whereby the articles will be spaced as they are advanced and will be delivered in spaced relation on the receiving conveyor 3.

While the present description sets forth a preferred embodiment of the invention, various changes may be made in the construction without departing from the spirit of the invention, and it is therefore desired that the present embodiment be considered in all respects as illustrative and not restrictive, reference being had to the appended claim rather than to the foregoing description to indicate the scope of the invention.

We claim:

Mechanism for turning rectangular article comprising a feeding conveyor for advancing a row of articles, a receiving conveyor aligned with the feeding conveyor and in spaced relation thereto, an article supporting and turning section interposed between the feeding and receiving conveyors, said turning section comprising a plurality of closely related, elongated, tapered rolls mounted on axes parallel with each other, said axes being uniformly disposed at an angle to the horizontal inclining upward in the direction of the small ends of the tapered rolls sufficient to dispose the article supporting surfaces of the rolls in an approximately horizontal plane, the feeding conveyor being operative to discharge articles onto the turning section, and means for driving said tapered rolls in the same direction, whereby articles fed onto the turning section will be rotated approximately 90 degrees and discharged onto the receiving conveyor.

References Cited by the Examiner
UNITED STATES PATENTS

| | | |
|---|---|---|
| 586,866 | 7/1897 | Potter. |
| 1,069,362 | 8/1913 | Wegner. |
| 1,960,307 | 5/1934 | Fisk _____ 198—127 X |
| 2,767,666 | 10/1956 | Rhodes. |

SAMUEL F. COLEMAN, *Primary Examiner.*